United States Patent
Duan

(10) Patent No.: US 6,407,194 B1
(45) Date of Patent: Jun. 18, 2002

(54) TEMPORARILY CROSSLINKED POLYESTER POLYMERS

(75) Inventor: Jiwen F. Duan, Apex, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/907,050

(22) Filed: Jul. 17, 2001

(51) Int. Cl.$^7$ ................................................ C08G 77/04
(52) U.S. Cl. ............................ 528/26; 528/27; 528/38; 528/272; 528/288; 528/297; 528/300; 528/302; 528/306; 528/308; 528/308.6; 524/188; 524/196
(58) Field of Search ................................. 528/272, 288, 528/297, 300, 302, 306, 308, 308.6, 26, 29, 38; 524/188, 196

(56) References Cited

U.S. PATENT DOCUMENTS

| | | |
|---|---|---|
| 4,551,485 A | 11/1985 | Ragan et al. |
| H1275 H | 1/1994 | Duncan |
| 6,037,055 A | 3/2000 | Aneja et al. |

FOREIGN PATENT DOCUMENTS

| | | |
|---|---|---|
| DE | 2213534 | 11/1972 |

OTHER PUBLICATIONS

Japenese Patent Abstract 62149722 A, Polyester produn.–by ester–exchanging or esterifying terephalic acid and glycol and plycondensing.
Japanese Patent Abstract 11140286 A2, Manufacture of clay–dispoersed plyester resint compositions with excellent heat reisitance, Suzuki, Noriyuki.

*Primary Examiner*—Samuel A. Acquah
(74) *Attorney, Agent, or Firm*—Charles E. Krukiel

(57) ABSTRACT

A process for increasing the pill resistance of a polyester polymer wherein the polyester polymer is produced by polymerizing a polymerization mixture comprising (a) a carbonyl compound or an oligomer of the carbonyl compound and (b) a glycol. The process comprises contacting the polymerization mixture with a cross-linker comprising $(RO)_m Si(X)_n Z_p$, wherein: R is hydrogen, a hydrocarbon, or a hydrocarbon oxygen; X is a hydrocarbon or a hydrocarbon oxygen; Z is a hydrophilic group; m is 1 to 3; n is 1 to 3; and p is 1 to 30.

22 Claims, No Drawings

TEMPORARILY CROSSLINKED POLYESTER POLYMERS

FIELD OF THE INVENTION

This invention relates to polyester polymers. More specifically, this invention relates to polyester polymers having temporarily crosslinked polyester molecules.

BACKGROUND OF THE INVENTION

Polyesters are widely used to manufacture textile fibers and can be manufactured by combining a glycol, such as ethylene glycol, and a carbonyl compound, such as dimethyl terephthalate (DMT) or terephthalic acid (TPA). In the DMT process, DMT reacts with a glycol, such as ethylene glycol, to form a bis-glycolate ester of terephthalate ("monomer") and a byproduct methanol in an ester exchanger column. The monomer is then polymerized by condensation reactions in one or two prepolymerizers and then a final polymerizer or finisher.

In the TPA process, TPA is combined with a glycol, such as ethylene glycol, to form a slurry at 60° C. to 100° C. followed by injecting the slurry into an esterifier. A linear oligomer with a degree of polymerization less than 10 is formed in one or two esterifiers (first and second in series, if two) at temperatures from 240° C. to 290° C. The oligomer is then polymerized in one or two prepolymerizers and then in a final polymerizer or finisher at temperatures from 250° C. to 300° C. Water is a byproduct of the TPA esterification and polycondensation process.

A problem associated with polyester fibers is their tendency to pill. Pilling is a defect in fabric caused when fibers are rubbed or pulled out of yarns and entangled with intact fibers, forming soft, fuzzy balls on the fabric surface. One of the most common commercial practices to produce pilling resistant fibers is to make lower molecular weight polyester fibers with an intrinsic viscosity of 0.30 to 0.55, which have lower strength and are pill resistant. Unfortunately, spinning is more difficult with lower molecular weight and lower strength polyester fibers.

A temporary crosslinker, brancher, or melt viscosity booster can be used to increase melt viscosity and polymer strength temporarily for better spinning performance. Tetraethoxysilane (TEOS) has been used commercially for many years as a temporary brancher for pilling resistant polyesters made from DMT process. TEOS temporarily crosslinks or branches polyester molecules and increases melt viscosity and strength for spinning. After spinning, the crosslinks break down by hydrolysis in drawing and other processes, thereby obtaining lower molecular weight fibers and offering pilling resistant properties.

Unfortunately, the use of TEOS as a temporary brancher for pilling resistant polyesters is not compatible with the TPA process. A major problem with TEOS is that TEOS forms sands and solids when it reacts with water. Although TEOS is suitable for the DMT process, where there is no water byproduct, the TPA process produces a water byproduct. Therefore, TEOS is not suitable for the TPA process due to the formation of sands and solids by the reaction of TEOS with the water byproduct.

There have been many studies to use permanent crosslinkers such as trimethylolpropane (TMP) and trimellitic acid or its ester to produce pilling resistant fibers. Unfortunately, the permanent crosslinks do not break down after spinning and their pilling resistant properties are only from the increased brittleness from crosslinking. Polymer molecular weight must be high enough for good spinning, but the high molecular weight polymers have poor pilling resistance. Therefore, permanent crosslinkers are fundamentally inferior compared with temporary crosslinkers or branchers such as TEOS.

The TPA process has gradually become a preferred process for manufacturing of polyethylene terephthalate, polypropylene terephthalate, and polybutylene terephthalate, where water is a byproduct. Therefore, there is an increased need to develop a process to produce lower molecular weight polyesters with temporary crosslinks or branches to increase melt viscosity and strength for spinning, which does not form a solid in the presence of water.

Alkali metal salts of 5-sulfoisophthalic acids or their esters such as sodium sulfoisophthalic acid (Na-SIPA), sodium dimethylsulfoisophthalate (Na-DMSIP), and bis(2-hydroxyethyl) sodium 5-sulfoisophthalate (Na-SIPEG) have been studied to produce pilling resistant fibers. Unfortunately, to obtain desired pilling resistant properties, Na-SIPA or Na-SIPEG must be added at 3 to 10% by weight of polymer. Since Na-SIPA and Na-SIPEG cost about ten times more than TPA or DMT, the copolymer is much more expensive. In addition, this copolymer can only be hydrolyzed in acidic solution. A further problem with this copolymer is that melt viscosity is increased by the self association of the sodium sulfoisophthalate (Na-SIP) chain, not by molecular bonds. Therefore, even though the melt viscosity is high, the polymer strength is low and spinning performance is poor.

An additional consideration for producing polyester polymers is the rate of crystallization of the partially oriented polyester polymer during spinning. Normal spinning speeds for partially oriented polyester polymers are typically on the order of about 3000–3500 m/min. At higher spinning speeds, however, crystallization of the partially oriented polyester polymer occurs too fast, which results in low orientation in fibers and deteriorates physical properties such as tenacity, elongation, and shrinkage.

To increase productivity and spin at higher speeds, such as speeds of 4000–5000 m/min., additives are injected to decrease the crystallization rate of the polyester polymer. These additives include, for example, (i) a permanent crosslinker such as trimellitic acid that is added during the polymerization process or (ii) a liquid crystal polymer that is added to the polyester transfer line. Unfortunately, the permanent crosslinker and liquid crystal polymer often introduce undesirable changes to the physical properties of the polyester polymer fiber, such as higher brittleness and lower tenacity and elongation.

Accordingly, there is also a desire to decrease the crystallization rate of the polyester polymer during spinning without adversely altering the physical properties of the polyester polymer fiber.

SUMMARY OF THE INVENTION

The present invention provides a process for increasing the pill resistance of a polyester polymer, wherein the polyester polymer is produced by polymerizing a polymerization mixture comprising (a) a carbonyl compound or an oligomer of the carbonyl compound and (b) a glycol. The process comprises contacting the polymerization mixture with a cross-linker comprising $(RO)_m Si(X)_n Z_p$, wherein:

R is hydrogen, a hydrocarbon, or a hydrocarbon oxygen;

X is a hydrocarbon or a hydrocarbon oxygen;

Z is a hydrophilic group;

m is 1 to 3;

n is 1 to 3; and p is 1 to 30.

The invention also provides a process for decreasing the crystallization rate of a polyester polymer during a spinning, wherein said polyester polymer is produced by polymerizing a polymerization mixture that comprises (a) a carbonyl compound or an oligomer of said carbonyl compound and (b) a glycol, said process comprising contacting said polymerization mixture with a cross-linker comprising $(RO)_m Si(X)_n Z_p$, wherein:

R is hydrogen, a hydrocarbon or a hydrocarbon oxygen;

X is a hydrocarbon or a hydrocarbon oxygen;

Z is a hydrophilic group;

m is 1 to 3;

n is 1 to 3; and p is 1 to 30.

In another embodiment of the invention, the polyester polymer is produced by polymerizing a polymerization mixture that comprises a carbonyl compound or an oligomer of the carbonyl compound, wherein the carbonyl compound is HO—$R^2$—COOH, wherein $R^2$ is (i) hydrogen, (ii) a hydrocarbon having 1 to 30 carbon atoms, or (iii) a hydrocarbon oxygen group having 1 to 30 carbon atoms and 1 to 20 oxygen atoms.

The invention also includes a pill resistant polyester polymer produced by the aforementioned process. The process of the invention increases the melt viscosity and strength of the polyester polymer temporarily. In addition, the process of the invention decreases the crystallization rate of the polyester polymer during spinning.

In one embodiment of the invention, the cross-linker is added to the polymerization mixture before or during esterification of the carbonyl compound or oligomer. In another embodiment, the cross-linker is added to the polymerization mixture before or during transesterification of the carbonyl compound or oligomer. In yet another embodiment of the invention, the cross-linker is added to the polymerization mixture before, during, or after polycondensation of the carbonyl compound or oligomer.

The cross-linker of the invention lightly crosslinks or branches polyester molecules, and thereby increases the melt viscosity of the polyester polymer. The bonds of the branches or crosslinks are broken down after spinning the polyester polymer by hydrolysis in water, moisture, an alcohol, a weak acid, or a weak base.

In one embodiment, the cross-linker of the invention comprises $(RO)_m Si(X)_n Z_p$ wherein:

R is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms;

X is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms; and Z is a carboxylic acid or a salt thereof, sulfonic acid or a salt thereof, an amine, a nitrile, an isocyan, a hydroxy, an alkyl oxide, an epoxy alkane, an epoxy alkene, an epoxy alkyne, 1,4-dioxane, a tetrahydrofuran, or a combination of two or more thereof.

In another embodiment, the cross-linker comprises HO—$CH_2CH_2$—$Si(OCH_2CH_2OH)_3$, HO—$CH_2CH(OH)CH_2$—$Si(OCH_3)_3$, or HO—$CH_2CH(OH)CH(OH)CH_2$—$Si(OCH_3)_3$. In yet another embodiment, the cross-linker comprises 3-glycidoxypropyltrimethoxysilane.

DETAILED DESCRIPTION OF THE INVENTION

The term "cross-linker" as used herein refers to a compound that lightly crosslinks or branches polyester molecules, and thereby increases the melt viscosity of the polyester polymer. The bonds of the branches or crosslinks formed by the cross-linker are then broken down after spinning by hydrolysis in water, moisture, alcohol, weak acid, or weak base. The cross-linker of the invention comprises $(RO)_m Si(X)_n Z_p$, wherein:

R is hydrogen, a hydrocarbon, or a hydrocarbon oxygen;

X is a hydrocarbon or a hydrocarbon oxygen;

Z is a hydrophilic group;

m is 1 to 3;

n is 1 to 3; and p is 1 to 30.

In one embodiment of the invention, the cross-inker comprises $(RO)_m Si(X)_n Z_p$, wherein:

R is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms;

X is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms; and Z is a carboxylic acid or a salt thereof, sulfonic acid or a salt thereof, an amine, a nitrile, an isocyan, a hydroxy, an alkyl oxide, an epoxy alkane, an epoxy alkene, an epoxy alkyne, 1,4-dioxane, a tetrahydrofuran, or a combination of two or more thereof.

In another embodiment, the cross-linker comprises HO—$CH_2CH_2$—$Si(OCH_2CH_2OH)_3$, HO—$CH_2CH(OH)CH_2$—$Si(OCH_3)_3$, or HO—$CH_2CH(OH)CH(OH)CH_2$—$Si(OCH_3)_3$. In yet another embodiment, the cross-linker comprises 3-glycidoxypropyltrimethoxysilane (GTMS).

The crosslinks formed by Si—O bonds are temporary, because the Si—O bonds break down in the presence of moisture, water, an alcohol, a weak acid, or a weak base. However, the Si—C bond or bonds are permanent; they will not break down in the presence of moisture, water, alcohol, weak acid, or weak base. The hydrophilic group in the Si—C chain makes the silane compound soluble in water and glycol and, as a result, a solid does not form. For this reason, the crosslinker comprising $(RO)_m Si(X)_n Z_p$ can be used in TPA process, where there is water byproduct, without forming a solid in recycle glycol.

Tetraethoxysilane (TEOS, $Si(OCH_2CH_3)$), however, forms sand or solid in the recycle glycol of TPA process due to water byproduct, because there are no Si—C bonds and all four Si—O bonds break in water. Silane compounds that contain Si—C bonding without a hydrophilic group would also form solid in recycle glycol of TPA process, such as vinyltrimethoxysilane ($CH_2$=CH—$Si(OCH_3)_3$) or diphenylsilanediol (($C_6H_5)_2Si(OH)_2$), because those silane compounds are not soluble in water and glycol.

One aspect of the invention relates to a process for increasing the pill resistance of a polyester polymer. One of the most common approaches to produce pilling resistant polyester fibers is to make a low molecular weight and low strength polyester.

Unfortunately, low molecular weight polyester is difficult to spin because the strength of the polyester is too low. Temporary cross-linker $(RO)_m Si(X)_n Z_p$ can be added to increase the molecular weight or melt viscosity to obtain temporarily higher strength for spinning. After spinning, the temporary cross-linked bonds break down in the presence of moisture, water, an alcohol, a weak acid, or a weak base. The low molecular weight and low strength polyesters provide increased pilling resistance.

The present invention also provides a process for higher speed spinning to increase assets productivity.

The normal spinning speed for partially oriented yarn is 3000 to 3500 meter/min. Spinning speed is limited by the crystallization rate during spinning, because higher speed spinning induces a higher crystallization rate that reduces spun orientation and deteriorates the physical properties of the fiber, such as tenacity and elongation. Cross-linker $(RO)_mSi(X)_nZ_p$ can be added to polyester to reduce the crystallization rate during spinning, therefore spinning speed can be increased such that a desired product is achieved with acceptable levels of crystallization and orientation. The increase of the spinning speed can be determined by one of skill in the art with routine experimentation. The cross-linker can be added to the polymerization mixture before or during polymerization to reduce the crystallization of the polyester polymer that results from spinning.

The cross-linker of the invention that comprises $(RO)_mSi(X)_nZ_p$ can be dissolved in a solvent in any suitable manner and in any suitable container, vessel, or reactor at ambient temperature or elevated temperatures from 0° C. to 220° C. Examples of suitable solvents include, but are not limited to, water, alkyl alcohol, ethylene glycol, propylene glycol, isopropylene glycol, butylene glycol, 1-methyl propylene glycol, pentylene glycol, diethylene glycol, triethylene glycol, polyethylene glycols, polyoxyethylene glycols, polyoxypropylene glycols, polyoxybutylene glycols, and combinations of two or more thereof. A preferred glycol is an alkylene glycol, such as ethylene glycol or 1,3-propanediol, because the polyester produced using an alkylene glycol has a wide range of industrial applications.

The cross-linker can be added to the polymerization process before, during, or after transesterification or esterification of the carbonyl compound or an oligomer of the carbonyl compound. Similarly, the cross-linker can be added before, during, or after polycondensation of the carbonyl component or an oligomer of the carbonyl compound.

In one embodiment of the process of the invention, the polyester polymer is produced by polymerizing a polymerization mixture comprising (a) a carbonyl compound or an oligomer of a carbonyl compound and (b) a glycol. Any carbonyl compound which, when combined with a glycol, can produce a polyester can be used. Such carbonyl compounds include, but are not limited to, acids, esters, amides, acid anhydrides, acid halides, salts of carboxylic acid oligomers or polymers having repeat units derived from an acid, or combinations of two or more thereof. A preferred acid is an organic acid such as a carboxylic acid or salt thereof. The oligomer of a carbonyl compound such as TPA and glycol generally has a total of about 2 to about 100, preferably from about 2 to about 20 repeat units derived from the carbonyl compound and glycol.

The organic acid or ester thereof can have the formula $R^2COOR^2$ in which each $R^2$ is independently selected from (i) hydrogen, (ii) a hydrocarboxyl radical having a carboxylic acid group at the terminus, or (iii) a hydrocarbyl radical in which each radical has 1 to 30, preferably about 3 to about 15, carbon atoms per radical which can be an alkyl, alkenyl, aryl, alkaryl, aralkyl radical, or combination of two or more thereof. The presently preferred organic acid or ester thereof has the formula $R^2O_2CACO_2R^2$ in which A is an alkylene group, arylene group, alkenylene group, or combination of two or more thereof and each $R^2$ is the same as above. Each A has 2 to 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, oxalic acid, maleic acid, and combinations of two or more thereof. Examples of suitable esters include, but are not limited to, dimethyl adipate, dimethyl phthalate, dimethyl terephthalate, dimethyl isophthalate, dimethyl glutarate, and combinations of two or more thereof.

The presently preferred organic diacid is terephthalic acid or its ester dimethyl terephthalate because the dyeable polyesters produced therefrom have a wide range of industrial applications.

Any suitable condition to effect the production of a polyester can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20 hours, preferably about 0.3 to about 15 hours, and most preferably 0.5 to 10 hours.

The molar ratio of the glycol to carbonyl compound can be any ratio so long as the ratio can effect the production of an ester or polyester. Generally the ratio can be in the range of from about 1:1 to about 10:1, preferably about 1:1 to about 5:1, and most preferably 1:1 to 4:1. The polyester produced by the invention process can comprise about 1 to about 1000 parts per million by weight (ppm) of antimony and about 1 to about 200 ppm, preferably about 5 to about 100 ppm, of phosphorus.

Optionally, a catalyst can be added to the polymerization process. The catalyst can be added before or during esterification, before or during transesterification, or before or during polycondensation. The catalyst can be an antimony, aluminum, cobalt, titanium, manganese, or zinc catalyst commonly employed in the manufacture of polyester. A preferred antimony compound can be any antimony compound that is substantially soluble in a solvent disclosed above. Examples of suitable antimony compounds include, but are not limited to, antimony oxides, antimony acetate, antimony hydroxides, antimony halides, antimony sulfides, antimony carboxylates, antimony ethers, antimony glycolates, antimony nitrates, antimony sulfates, antimony phosphates, and combinations of two or more thereof. The catalyst can be present in the range of about 0.001 to about 30,000 ppm of the medium comprising the carbonyl compound and glycol, preferably about 0.1 to about 1,000 ppm, and most preferably 1 to 100 ppm by weight. A cocatalyst, if present, can be in the range of from about 0.01 to about 1,000 ppm of the reaction medium.

The invention process can also be carried out using conventional melt or solid state techniques and in the presence or absence of a toner compound to reduce the color of a polyester produced. Examples of toner compounds include, but are not limited to, cobalt aluminate, cobalt acetate, Carbazole violet (commercially available from Hoechst-Celanese, Coventry, R.I., USA, or from Sun Chemical Corp, Cincinnati, Ohio, USA), Estofil Blue S-RLS® and Solvent Blue 45™ (from Sandoz Chemicals, Charlotte, N.C., U.S.A), and CuPc Blue (from Sun Chemical Corp, Cincinnati, Ohio, U.S.A). These toner compounds are well known to those skilled in the art. The toner compound can be used with the catalyst disclosed herein in the amount of about 0.1 ppm to 1000 ppm, preferably about 1 ppm to about 100 ppm, based on the weight of polyester polymer produced.

The process of the invention can also be carried out using a conventional melt or solid state technique and in the presence or absence of an optical brightening compound to reduce the yellowness of the polyester produced. Examples of optical brightening compounds include, but are not limited to, 7-naphthotriazinyl-3-phenylcoumarin (commercial name "Leucopure EGM", from Sandoz Chemicals, Charlotte, N.C., USA.) and 4,4'-bis(2-benzoxazolyl) stilbene (commercial name "Eastobrite", from Eastman Chemical, Kingsport, Tenn., USA). These optical brightening compounds are well known to those skilled in the art. The optical brightening compound can be used with the catalyst disclosed herein in the amount of about 0.1 ppm to 10,000 ppm, preferably about 1 ppm to about 1,000 ppm, based on the weight of polyester polymer produced.

EXAMPLES

The following examples are included to further illustrate the invention and are not to be construed as to unduly limit the scope of the invention.

Polymer molecular weight was determined by intrinsic viscosity (IV). The IV was expressed as LRV (laboratory relative viscosity) and NRV (non-acid relative viscosity). LRV was the ratio of the viscosity of a solution of 0.8 grams of polymer dissolved at room temperature in 10 ml of hexafluoroisopropanol (HFIP) containing 100 ppm sulfuric acid to the viscosity of the sulfuric acid containing HFIP itself, both measured at 25° C. in a capillary viscometer. The use of HFIP as a solvent is important in that it allows dissolution at the specified temperature and thereby avoids the polymer degradation normally encountered when polyesters are dissolved at elevated temperatures. NRV analysis was similar to LRV without the sulfuric acid in HFIP. NRV determines the molecular weight or melt viscosity of the polyester containing temporary crosslinks. LRV determines the molecular weight of the polyester after its temporary crosslinks breaks down by hydrolysis. The number of temporary crosslinks or branches in the polymer determine the difference between NRV and LRV.

In boil off shrinkage analysis, a filament of about 30 cm long was placed in boiling water at 100° C. for 30 minutes, the length before and after that was measured. In dry heat shrinkage, a filament of about 30 cm long was placed in an oven at 160° C. for 30 minutes, the length before and after that was measured.

The tenacity and elongation were from stress-strain curve measured by Model 1122 or 1123 Instron (from Instron Corp., Canton, Mass., USA.). Instron is a commercial testing instrument equipped with a strain gauge to measure force precisely, a "crosshead" that moves at a controllable constant speed, a chart recorder to record a graph of force vs. crosshead movement, and provision for interfacing with a computer to read and process force and motion data.

Example 1 (Preparative Example)

This example illustrates the preparation of solutions of cross-linkers that include GTMS and ethylene glycol.

GTMS (5 g of A-187 from Union Carbide, Danbury, Conn., USA) was added to ethylene glycol (95 g) in an open glass beaker at room temperature. After stirring for a few minutes, it became a clear one-phase solution.

GTMS (20 g of A-187 from Union Carbide, Danbury, Conn., USA) was added to ethylene glycol (80 g) in an open glass beaker at room temperature. After stirring for a few minutes, the mixture had two phases with GTMS on top. It became a clear one-phase solution when heated to 80° C. After heating at 100° C. for 40 minutes and cooled down, the mixture remained a clear one-phase solution.

Example 2 (Preparative Example)

This example illustrates the preparation of a cross-linker that includes GTMS and water, and a cross-linker that includes GTMS, water, and ethylene glycol.

GTMS (2 g of A-187 from Union Carbide, Danbury, Conn., USA) was added to water (38 g) in an open glass beaker. GTMS became a liquid sphere in the bottom. After stirring for 2 minutes, the mixture became a clear one-phase solution.

GTMS (10 g of A-187 from Union Carbide, Danbury, Conn., USA), ethylene glycol (80 g), and water (10 grams) were mixed in an open glass beaker at room temperature. It became a clear one-phase solution after stirring. This example indicated GTMS does not form a solid when mixed with water or ethylene glycol.

Example 3

Example 3 was a continuous pilot plant process to produce pilling resistant staple from TPA process with a cross-linker comprising GTMS at a polymer flow rate of 45.4 kg/hour. The polyester esterification, polycondensation, melt spinning, relax drawing and anneal drawing and crimping, cutting, and staple ring pinning processes are well known to one skilled in the art, and only a brief description is provided here.

A TPA slurry tank was continuously charged with TPA powder and ethylene glycol. A TPA charge rate of about 10,500 kg/hour was controlled by a powder screw feeder to keep desired oligomer flow rate at about 12,600 kg/hour. The ethylene glycol flow rate was controlled by density signal of a mass flow meter such that the molar ratio of ethylene glycol and TPA was 2.0. The ethylene glycol was a mixture of virgin glycol and recycled glycol from the condensed vapor from esterifier and prepolymerizers and finisher. The TPA slurry at about 80° C. was injected into a recirculating esterifier at a rate to keep a desired polymer flow rate and a constant oligomer liquid level in the esterifier. The temperature in the esterifier was controlled at 285° C., and absolute pressure was 1.07 atm (108 kPa). The vapor from the esterifier was condensed and separated into ethylene glycol and water, the glycol was mixed with the condensed glycol from the vapor from prepolymerizers and finisher, and then mixed with virgin glycol and charged into the TPA slurry tank.

Most of the oligomer from the above esterifier went to a commercial polymerization process. About 47 kg/hour of the above oligomer was used in a pilot plant continuous polymerization process. Antimony glycolate (from Elf Atochem, Carrolton, Ky., USA) in ethylene glycol solution containing Sb 1% by weight, Anatase $TiO_2$ (grade LW-S-U, from Sachtleben Chemie GmbH, Duisburg, Germany) 20% slurry in ethylene glycol, triethyl phosphonoacetate (TEPA, from Albright & Wilson America, Richmond, Va., USA) in ethylene glycol solution or phosphoric acid in ethylene glycol solution containing phosphorous 0.158% were injected into the oligomer line followed by static mixers before the first prepolymerizer. The injection rate was controlled by meter pumps and calibrated by burette check. Calculated additive concentration in polymer from injection: antimony 200 to 80 ppm; $TiO_2$ 0.3%; and phosphorous 10 ppm.

GTMS (36.3 kg of Z-6040 from Dow Corning, Midland, Mich., USA) was added to ethylene glycol (145.2 kg) in an agitated mix tank and the mixture was heated at 100° C. for 1 hour to form a clear one-phase solution. The 20% GTMS solution was injected into oligomer line to obtain GTMS in polymer 0.215% to 0.437% by weight.

The oligomer was pumped to the first prepolymerizer ("flasher"), which was controlled at 270° C. absolute pressure 100 mm Hg (13.33 kPa). The prepolymer from the flasher flowed into the second prepolymerizer ("PP") and then to a final polymerizer ("finisher"). The PP was controlled at 275° C. and 40 mm Hg (5.33 kPa). The finisher was controlled at 282° C. and at an absolute pressure cascaded to an online melt viscometer. The online melt viscometer was used to determine polymer molecular weight, which was calibrated by non-acid solution viscosity in a laboratory (NRV).

The polymer from the finisher was pumped to a spinning machine. The polymer transfer line temperature was controlled at 280° C. The spinning speed and spun tow denier are provided in Table 1 below.

The spun yarns were drawn in hot water of 95° C. The crimp temperatures were relaxed 120° C. for 8 minutes for single stage drawing and relax process, and 173° C. on annealer rolls and relaxed 80° C. for 8 minutes for single stage drawing and anneal process. The drawn yarns were cut into staples of 3.8 cm in length.

The drawn yarns were tested on a Satec Flex-life Tester (from SATEC System, Grove City, Pa., USA) for flex life. Fibers under fixed tension (2 gram weight for filament denier 2.25 or more, 1 gram weight if less than 2.25 denier) were pulled back and forth at a 90° angle over the edge of a hardened metal bar having 0.001 inch radius of curvature. Although some abrasion was involved, the cycles to failure were interpreted as a flex life. For each reading, the instrument was allowed to run until all 10 filaments failed; the average of 20 readings was recorded as the flex life for each sample. Generally, the lower the flex life number, the better the pilling resistance performance would be.

The staples were carded in a Trutzschler carding machine (from Trutzschler, Moenchengladbach, Germany), drawn in a Rieter draw frame (from Rieter, Winterthur, Switzerland) with draw speed 350 m/min. and sliver weight 59.4 g/m in break drawing and 53.0 g/m in finisher drawing, roved at 0.77 hank roving and 0.75 twist multiple, ring spun at 22 yarn count per cotton count and 3.5 twist multiples. Next, the yarns were knitted into 21 $M^2$ of fabric and dyed with disperse dye for an Atlas random tumble pilling test. The ring spinning and Atlas random tumble pilling test were run with PET 100% and PET/cotton 50/50 blend. To reduce cost, the staple from Item A was not run in ring spinning, and Atlas random tumble pilling data were not determined.

The Atlas random tumble pill test was run according to ASTM D-3512-96 of the American Society For Testing and Materials using a Atlas Random Tumble Pilling Tester Model PT-4 (Atlas Electric Devices Company, Chicago, Ill., USA). Pilling and other changes in surface appearance, such as fuzzing, that occur in normal wear were simulated on a laboratory testing machine. Pills were caused to form on fabric by a random rubbing action produced by tumbling specimens in a cylindrical test chamber lined with a mildly abrasive material. To form pills with appearance and structure that resemble those produced in actual wear, small amounts of short-length gray cotton fiber were added to each test chamber with the specimens. The degree of fabric pilling was evaluated by comparison of the tested specimens with visual standards that may be actual fabrics, or photographs of fabrics, showing a range of pilling resistance. The observed resistance to pilling was reported using the following rating scale:

5=no pilling
4=slight pilling
3=moderate pilling
2=heavy pilling
1=severe pilling.

TABLE 1

Pilling Resistant Polymer from TPA Process with a Cross-Linker Comprising GTMS

| Pilot Plant Item | A | B | C | D |
|---|---|---|---|---|
| Injected GTMS in polymer | 0.215% | 0.247% | 0.390% | 0.437% |
| Injected $H_3PO_4$ in polymer | | 10 ppm | 10 ppm | 10 ppm |
| Injected TEPA in polymer | 10 ppm | | | |
| LRV | 11.98 | 11.62 | 10.30 | 9.70 |
| NRV | 16.10 | 15.74 | 15.67 | 15.35 |
| Spinninq speed, m/min | 1,463 | 1,463 | 1,463 | 1,280 |
| Spun tow denier, g/9000 m | 3,600 | 3,600 | 3,600 | 4,316 |
| Filament | 900 | 900 | 900 | 520 |
| Drawing process | Relax | Relax | Anneal | Relax. |
| Draw Ratio | 3.57 | 3.57 | 3.28 | 3.13 |
| Denier, gram/9000 m | 1.24 | 1.24 | 1.41 | 2.97 |
| Tenacity, grain/denier | 3.93 | 3.69 | 2.70 | 3.67 |
| Elongation, % | 29.7 | 26.0 | 24.8 | 42.9 |
| Dry heat shrinkage, % | 8.35 | 7.60 | 6.00 | 4.95 |
| Boil off shrinkage, % | 3.60 | 3.30 | 2.50 | 1.80 |
| Crimp take up per inch | 32.7 | 31.0 | 25.5 | 29.3 |
| Flex Life | 1862 | 1537 | 345 | 534 |
| PET | | | | |
| 15 minute tumble | | 2.5 | 3.5 | 4.5 |
| 30 minute tumble | | 2.0 | 3.8 | 4.5 |
| 60 minute tumble | | 1.3 | 5.0 | 5.0 |
| 90 minute tumble | | 1.0 | 5.0 | 5.0 |
| 120 minute tumble | | 1.0 | 5.0 | 5.0 |
| PET/cotton 50/50 blend | | | | |
| 15 minute tumble | | 1.5 | 1.5 | 1.0 |
| 30 minute tumble | | 1.8 | 2.0 | 1.0 |
| 60 minute tumble | | 1.0 | 1.0 | 1.0 |

Example 4 (Comparative Example)

Example 4 was a commercial continuous process to produce pilling resistant staple from DMT with temporary crosslinker Tetraethoxysilane (TEOS) at polymer flow rate 2500 kg/hour, this example was given for comparison purposes.

The ester exchanger was a vertical reactive distillation column with 20 plates, the bottom plate was the $1^{st}$ plate, top plate the $20^{th}$ plate. Molten DMT at 175° C. was continuously charged to the $16^{th}$ plate to obtain 2500 kg/hour of polymer flow rate. Catalyst-containing ethylene glycol solution at 185° C. was continuously charged into the $17^{th}$ plate, the mole ratio of glycol to DMT was 2.0. Transesterification catalyst manganese acetate tetrahydrate, polycondensation catalyst antimony oxide and tetraisopropyl titanate, temporary crosslinker TEOS, and sodium acetate were added into catalyzed glycol. Each batch of catalyst-containing glycol solution contained ethylene glycol 3629 kg, 0.021% Mn from manganese acetate tetrahydrate (Mn in polymer 135 ppm), 0.530 kg of anhydrous sodium acetate, and 0.090% of Sb from antimony oxide, tetraisopropyl titanate 300 ml, TEOS 12 to 24 kg. The calandria temperature was controlled at 236° C., the $13^{th}$ plate temperature was controlled at about 181° C., the $20^{th}$ plate temperature was controlled at 110° C. by methanol reflux.

The monomer from the ester exchanger calandria was pumped into the first prepolymerizer ("flasher"). Inhibitor and color control agent phosphoric acid solution and delusterant TiO$_2$ slurry were injected into the monomer line before flasher. The ingredient injection rate was controlled by mass flow meters and meter pumps and controlled at a ratio to monomer flow rate.

The flasher temperature was controlled at 240° C., absolute pressure 130 mm Hg (17.33 kPa). The prepolymer from flasher flowed into the second prepolymerizer ("PP") and then to a final polymerizer ("finisher"). The PP was controlled at 272° C. and 35 mm Hg (4.67 kPa). The finisher was controlled at 280° C. and at an absolute pressure cascaded to an online melt viscometer, which was calibrated by non-acid solution viscosity (NRV) in a laboratory.

The flex life, ring spinning, and Atlas random tumble pilling test were run in the same machine at the same conditions as Example 4.

TABLE 2

Pilling Resistant Polymer from DMT Process with TEOS

| Product | 107W | 80D | S-655 |
|---|---|---|---|
| Added TEOS in polymer | 0.232% | 0.390% | 0.422% |
| LRV | 11.5 | 10.0 | 10.1 |
| NRV | 15.8 | 15.4 | 15.4 |
| Drawing process | Relax | Anneal | Relax |
| Denier, gram/9000 m | 1.50 | 1.20 | 3.00 |
| Tenacity, gram/denier | 3.8 | 3.5 | 2.5 |
| Elongation, % | 38 | 23 | 28 |
| Flex Life | 1300 | 400 | 850 |
| PET | | | |
| 15 minute tumble | 2.0 | 2.5 | 3.0 |
| 30 minute tumble | 1.5 | 2.5 | 2.5 |
| 60 minute tumble | 1.0 | 3.0 | 4.0 |
| 90 minute tumble | 1.0 | 4.5 | 5.0 |
| 120 minute tumble | 1.0 | 5.0 | 5.0 |
| PET/cotton 50/50 blend | | | |
| 15 minute tumble | 1.5 | 2.8 | 1.8 |
| 30 minute tumble | 1.8 | 2.0 | 1.0 |
| 60 minute tumble | 1.0 | 1.0 | 1.0 |

Comparing the trial production in pilot plant in Example 3 with commercial products in Example 4 in terms of LRV and NRV: Item B from TPA process with a cross-linker comprising GTMS was similar to commercial product 107W from DMT process with temporary crosslinker TEOS; Item C was similar to 80D; and Item D was similar to S-655. Items C and D, however, had the advantage of lower flex lives than 80D and S-655, respectively. Furthermore, Items B, C, and D had the advantage of a higher rating on the Atlas random tumble pilling test than 107W, 80D, and S-655, respectively, with 100% PET, although their pilling rating with PET/cotton 50/50 blend was similar. Item B and C had lower tenacity compared with 107W and 80D, respectively.

Example 5 (Comparative Example)

This example illustrates that (i) silane compounds containing both Si—O bonds and Si—C bonds without a hydrophilic group on the Si—C chain will form solids in recycle glycol of TPA process due to byproduct water and that (ii) silane compounds containing both Si—O bonds and Si—C bond and hydrophilic group on the Si—C chain will not form any solid in the recycle glycol of TPA process. The results are provided in Table 3.

The pilot plant continuous polymerization process was described in Example 3. TPA oligomer from the same commercial process was used, polymer flow rate was also the same 45.4 kg/hour. The solutions of silane compounds in ethylene glycol were prepared as follows.

Diphenylsilanediol (DPSD, $(C_6H_5)_2Si(OH)_2$, D6150 from Huls America, Piscataway, N.J., USA) 18.1 kg was dissolved in 54.4 kg of ethylene glycol in an agitated mix tank at 160° C. for 1 hour.

Vinyltrimethoxysilane (VTMS, $CH_2$=CH—$Si(OCH_3)$, A-171 from Union Carbide, Danbury, Conn., USA) 3.2 kg was dissolved in 9.5 kg of ethylene glycol in an agitated mix tank at room temperature for 1 hour.

Vinyltriethoxysilane (VTES, $CH_2$=CH—$Si(OCH_2CH_3)$, A-151 from Union Carbide, Danbury, Conn., USA) 6.8 kg was dissolved in 20.4 kg of ethylene glycol in an agitated mix tank at room temperature for 1 hour.

3-glycidoxypropyltrimethoxysilane (GTMS, $CH_2(O)CHCH_2OCH_2CH_2CH_2$—$Si(OCH_3)_3$, A-187 from Union Carbide, Danbury, Conn., USA) 10 kg was dissolved in 90 kg of ethylene glycol in an agitated mix tank at 80° C. for 1 hour.

TABLE 3

Solid Formation in Recycle Glycol of TPA Process by Silane Compounds

| Silane compound | Concentration in polymer from injection, wt % | Concentration in polymer by X-ray, wt % | Solids in recycle glycol? |
|---|---|---|---|
| DPSD | 0.8% | 0.54% | Yes |
| DPSD | 1.2% | 1.20% | Yes |
| VTMS | 0.3% | 0.45% | Yes |
| VTES | 0.6% | 0.47% | Yes |
| GTMS | 0.5% | 0.52% | No |

These results indicate that GTMS was the only silane compound that did not form solids in the recycle glycol.

It is to be understood that the above described embodiments are illustrative only and that modification throughout may occur to one skilled in the art. Accordingly, this invention is not to be regarded as limited to the embodiments disclosed herein.

What is claimed is:

1. A process for increasing the pill resistance of a polyester polymer, wherein said polyester polymer is produced by polymerizing a polymerization mixture comprising (a) a carbonyl compound or an oligomer of said carbonyl compound and (b) a glycol, said process comprising contacting said polymerization mixture with a cross-linker comprising $(RO)_mSi(X)_nZ_p$, wherein:

R is hydrogen, a hydrocarbon, or a hydrocarbon oxygen;

X is a hydrocarbon or a hydrocarbon oxygen;

Z is a hydrophilic group;

m is 1 to 3;

n is 1 to 3; and p is 1 to 30.

2. The process of claim 1 wherein:

said R is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms;

said X is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms; and said Z is a carboxylic acid or a salt thereof, sulfonic acid or a salt thereof, an amine, a nitrile, an isocyan, a hydroxy, an alkyl oxide, an epoxy alkane, an epoxy alkene, an epoxy alkyne, 1,4-dioxane, a tetrahydrofuran, or a combination of two or more thereof.

3. The process of claim 1 wherein said cross-linker comprises $HO-CH_2CH_2-Si(OCH_2CH_2OH)_3$, $HO-CH_2CH(OH)CH_2-Si(OCH_3)_3$, or $HO-CH_2CH(OH)CH(OH)CH_2-Si(OCH_3)_3$.

4. The process of claim 1 wherein said cross-linker comprises 3-glycidoxypropyltrimethoxysilane.

5. The process of claim 1 wherein said cross-linker is dissolved in a solvent.

6. The process of claim 5 wherein said solvent is a glycol or water.

7. The process of claim 1 wherein said cross-linker is added to said polymerization mixture:
   before or during an esterification of said carbonyl compound or said oligomer of said carbonyl compound;
   before or during a transesterification of said carbonyl compound or said oligomer of said carbonyl compound; or
   before, during, or after a polycondensation of said carbonyl compound or said oligomer of said carbonyl compound.

8. The process of claim 1 wherein said carbonyl compound is a carboxylic acid or a salt thereof.

9. The process of claim 1 wherein said carbonyl compound is $HO-R^2-COOH$, wherein $R^2$ is (i) hydrogen, (ii) a hydrocarbon having 1 to 30 carbon atoms, or (iii) a hydrocarbon oxygen group having 1 to 30 carbon atoms and 1 to 20 oxygen atoms.

10. The process of claim 1 wherein said carbonyl compound is $R^2COOR^2$, wherein each $R^2$ is independently selected from the group consisting of (i) hydrogen, (ii) a hydrocarboxyl radical having a carboxylic acid group at the terminus, and (iii) a hydrocarbyl radical in which each radial has 1 to 30 carbon atoms per radical selected from the group consisting of an alkyl, alkenyl, aryl, alkaryl, aralkyl radical, and combinations of two or more thereof.

11. The process of claim 1 wherein said carbonyl compound is $R^2O_2CACO_2R^2$, wherein:
   A is an alkylene group, arylene group, alkenylene group, or combinations of two or more thereof having 2 to 30 carbon atoms per group; and
   each $R^2$ is independently selected from the group consisting of (i) hydrogen, (ii) a hydrocarboxyl radical having a carboxylic acid group at the terminus, and (iii) a hydrocarbyl radical in which each radical has 1 top 30 carbon atoms per radical selected from the group consisting of an alkyl, alkenyl, aryl, alkaryl, aralkyl radical, and combinations of two or more thereof.

12. The process of claim 1 wherein said carbonyl compound comprises terephthalic acid, isophthalic acid, napthalic acid, succinic acid, adipic acid, phthalic acid, glutaric acid, oxalic acid, maleic acid, or a combination of two or more thereof.

13. The process of claim 1 wherein said carbonyl compound comprises dimethyl adipate, dimethyl phthalate, dimethyl terephthalate, dimethyl isophthalate, dimethyl glutarate, or a combination of two or more thereof.

14. The process of claim 1 wherein the oligomer of said carbonyl compound has 2 to 100 repeat units of said carbonyl.

15. The process of claim 1 wherein the oligomer of said carbonyl compound has 2 to 20 repeat units of said carbonyl compound.

16. A process for increasing the pill resistance of a polyester polymer, wherein said polyester polymer is produced by polymerizing a polymerization mixture that comprises a carbonyl compound or an oligomer of said carbonyl compound, said process comprising contacting said polymerization mixture with a cross-linker comprising $(RO)_mSi(X)_nZ_p$, wherein:
   R is hydrogen, a hydrocarbon, or a hydrocarbon oxygen;
   X is a hydrocarbon or a hydrocarbon oxygen;
   Z is a hydrophilic group;
   m is 1 to 3;
   n is 1 to 3; and
   p is 1 to 30,
wherein said carbonyl compound is $HO-R^2-COOH$, wherein $R^2$ is (i) hydrogen, (ii) a hydrocarbon having 1 to 30 carbon atoms, or (iii) a hydrocarbon oxygen group having 1 to 30 carbon atoms and 1 to 20 oxygen atoms.

17. The process of claim 16 wherein:
   said R is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms;
   said X is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms; and
   said Z is a carboxylic acid or a salt thereof, sulfonic acid or a salt thereof, an amine, a nitrile, an isocyan, a hydroxy, an alkyl oxide, an epoxy alkane, an epoxy alkene, an epoxy alkyne, 1,4-dioxane, a tetrahydrofuran, or a combination of two or more thereof.

18. The process of claim 16 wherein said cross-linker comprises 3-glycidoxypropyltrimethoxysilane.

19. A pill resistant polyester polymer comprising crosslinked polyester molecules, said polymer produced by polymerizing a polymerization mixture comprising (a) a carbonyl compound or an oligomer of said carbonyl compound and (b) a glycol, in the presence of a cross-linker comprising $(RO)_mSi(X)_nZ_p$, wherein:
   R is hydrogen, a hydrocarbon, or a hydrocarbon oxygen;
   X is a hydrocarbon or a hydrocarbon oxygen;
   Z is a hydrophilic group;
   m is 1 to 3;
   n is 1 to 3; and
   p is 1 to 30.

20. The polymer of claim 19 wherein said crosslinked polyester molecules are hydrolyzable in water, moisture, an alcohol, a weak acid, or a weak base.

21. A process for decreasing the crystallization rate of a polyester polymer during a spinning, wherein said polyester polymer is produced by polymerizing a polymerization mixture that comprises (a) a carbonyl compound or an oligomer of said carbonyl compound and (b) a glycol, said process comprising contacting said polymerization mixture with a cross-linker comprising $(RO)_mSi(X)_nZ_p$, wherein:
   R is hydrogen, a hydrocarbon or a hydrocarbon oxygen;
   X is a hydrocarbon or a hydrocarbon oxygen;
   Z is a hydrophilic group;
   m is 1 to 3;
   n is 1 to 3; and
   p is 1 to 30.

22. The process of claim 21 wherein:
   said R is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms;

said X is hydrogen, an alkyl group containing 1 to 30 carbon atoms, a hydroxyalkyl group containing 1 to 30 carbon atoms, or a polyoxyalkyl group containing 1 to 30 carbon atoms and 1 to 20 oxygen atoms; and said Z is a carboxylic acid or a salt thereof, sulfonic acid or a salt thereof, an amine, a nitrile, an isocyan, a hydroxy, an alkyl oxide, an epoxy alkane, an epoxy alkene, an epoxy alkyne, 1,4-dioxane, a tetrahydrofuran, or a combination of two or more thereof.

* * * * *